(12) United States Patent
Nishi

(10) Patent No.: US 7,250,994 B2
(45) Date of Patent: Jul. 31, 2007

(54) LIQUID CRYSTAL DISPLAY PANEL AND METHOD FOR MANUFACTURING LIGHT REFLECTING FILM THEREOF

(75) Inventor: Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 64 days.

(21) Appl. No.: 10/895,963

(22) Filed: Jul. 22, 2004

(65) Prior Publication Data

US 2004/0263728 A1    Dec. 30, 2004

Related U.S. Application Data

(63) Continuation of application No. 08/974,621, filed on Nov. 19, 1997, now Pat. No. 6,781,652.

(30) Foreign Application Priority Data

Nov. 20, 1996   (JP) .................................. 8-323339

(51) Int. Cl.
*G02F 1/1335*   (2006.01)
*G02F 1/13*     (2006.01)

(52) U.S. Cl. ...................... 349/113; 349/187
(58) Field of Classification Search ................ 349/113, 349/139, 187
See application file for complete search history.

(56) References Cited

U.S. PATENT DOCUMENTS

| | | |
|---|---|---|
| 4,519,678 A | 5/1985 | Komatsubara et al. |
| 5,219,691 A * | 6/1993 | Fukuda et al. ............. 430/57.4 |
| 5,311,338 A | 5/1994 | Kim et al. |
| 5,550,658 A | 8/1996 | Yoshihiro |
| 5,592,318 A | 1/1997 | Majima et al. |
| 5,595,790 A | 1/1997 | Wei |
| 5,608,251 A | 3/1997 | Konuma et al. |
| 5,620,905 A | 4/1997 | Konuma et al. |
| 5,650,890 A | 7/1997 | Kuroki et al. |

(Continued)

FOREIGN PATENT DOCUMENTS

EP    0 650 197    4/1995

(Continued)

*Primary Examiner*—Dung T. Nguyen
(74) *Attorney, Agent, or Firm*—Fish & Richardson P.C.

(57) ABSTRACT

A reflection type liquid crystal display panel is arranged such that between an active matrix substrate and an opposing substrate there are provided thin film transistors, interlayer insulating film, pixel electrodes, light reflecting films, orientation film, phase transition type guest/host liquid crystal, orientation film, opposing electrode, and color filter in this order. The pixel electrodes are disposed on the active matrix substrate in the form of a matrix with the interlayer insulating film interposed therebetween and also are respectively connected to the thin film transistors. The light reflecting films are each formed by the upper surface of the pixel electrode per se being made into a porous layer. The porous layer formed as the light reflecting film can make the light scattering large in amount and can also reflect the light in a desired direction by changing its pore size or depth. Therefore, the liquid crystal display panel can be applied as liquid crystal display panels for use in a wide range of electronic devices. That is, a liquid crystal display panel high in luminance can be provided by making the light reflecting film into a porous layer and making the light scattering large in amount.

25 Claims, 5 Drawing Sheets

U.S. PATENT DOCUMENTS 5,805,252 A 9/1998 Shimada et al.
6,000,121 A 12/1999 Kuroki et al.
6,025,893 A 2/2000 Kadowaki et al.
6,781,652 B1 * 8/2004 Nishi .......................... 349/113

FOREIGN PATENT DOCUMENTS

| EP | 1 538 676 | 6/2005 |
|---|---|---|
| JP | 02-039431 | 2/1990 |
| JP | 02-050446 | 2/1990 |
| JP | 05-307879 | 11/1993 |
| JP | 06-010170 | 1/1994 |
| JP | 06-018874 | 1/1994 |
| JP | 07-135323 | 5/1995 |

* cited by examiner

LIQUID CRYSTAL DISPLAY PANEL AND METHOD FOR MANUFACTURING LIGHT REFLECTING FILM THEREOF

CROSS-REFERENCE TO RELATED APPLICATIONS

This application is a continuation application of U.S. application Ser. No. 08/974,621, filed Nov. 19, 1997 now U.S. Pat. No. 6,781,652 (now allowed), which claims the benefit of a foreign priority application filed in Japan as Serial No. 08-323339 on Nov. 20, 1996. This application claims priority to each of these prior applications, and the disclosures of the prior applications are considered part of (and are incorporated by reference in) the disclosure of this application.

BACKGROUND OF THE INVENTION

1. Field of the Invention

The present invention relates to a liquid crystal display panel which is equipped to a word processor, personal computer or other electronic devices, and a method for manufacturing a light reflecting film of the liquid crystal display panel.

More particularly, the invention concerns a liquid crystal display panel which is of a reflection type wherein display is made by reflecting light having entered from the outside without using a back-light and which is small in power consumption, and a method for manufacturing a light reflecting film of the liquid crystal display panel.

2. Description of the Related Art

As a liquid crystal display panel there are a twisted nematic type which darkens due to the presence of two polarizing plates although it can have a high contrast, a super twisted nematic type which can have a high contrast and be driven in a simple way, a phase transition type guest/host type which is high in luminance and less in parallax error because of no need to use a polarizing plate, etc.

In the above-mentioned phase transition type guest/host liquid crystal, dichroic pigment is added to and mixed with the guest molecules in the host liquid crystal and, by varying the arrangement of the liquid crystal molecules by means of the voltage applied to the liquid crystal, the light absorptance of the liquid crystal layer is varied.

FIG. 5 is a typical view of a conventional example, illustrating the section of one pixel of a liquid crystal display panel using a phase transition type guest/host liquid crystal.

In FIG. 5, between an active matrix substrate 51 and an opposing substrate 52, there are formed sequentially from an upper surface of the active matrix substrate 51 thin film transistors 53, interlayer insulating film 54, pixel electrodes 55, light reflecting films 56 formed on the surface of the pixel electrodes, orientation film 57, phase transition type guest/host liquid crystal 58, orientation film 59, opposing electrode 60, and color filter 61 in this order.

Since FIG. 5 is intended to illustrate one pixel, the whole of the liquid crystal display panel is not illustrated therein. However, on the upper surface of the active matrix substrate 51, the thin film transistors 53 corresponding to a numeric value three times as large as the number of the pixels are formed in the form of a matrix. On the upper surface of the active matrix substrate 51, the pixel electrodes 55 corresponding to a numeric value three times as large as the number of the pixels are formed by being insulated by the interlayer insulating film 54.

In the above-mentioned liquid crystal display panel, incident light 62 having entered from the outside transmits through the opposing substrate 52, color filter 61, opposing electrode 60, orientation film 59, phase transition type guest/host liquid crystal 58 and orientation film 57 and then is reflected by the light reflecting film 56, whereupon the resulting light advances through a path opposite to that through which the incident light entered and goes outside, thus becoming a reflected light 63.

Also, the pixel electrode 55 is made of aluminum and is provided with fine concavities and convexities in order to scatter and reflect the light having entered thereinto by its surface. And, the concavities and convexities of the pixel electrode 55 are so designed that the light having entered from a direction inclined by an angle of 30° with respect to the direction orthogonal to the pixel electrode 55 may be strongly reflected in this direction orthogonal thereto.

And, the surface of the pixel electrode 55 is chemically formed with the concavities and convexities by etching which uses acid, such as hydrofluoric acid treatment, thereby constituting the light reflecting film 56.

Between the opposing electrode 60 and the pixel electrode 55 there is sealed the phase transition type guest/host liquid crystal 58. In its natural state, the phase transition type guest/host liquid crystal 58 is such that the host liquid crystal molecules are helically arranged. In a state where a voltage is applied thereto, the helicoid is released with the result that the molecules are arranged vertically with respect to the opposing substrate 52. For this reason, the phase transition type guest/host liquid crystal 58 makes it possible to obtain a high contrast without using a polarizing plate.

However, whereas the phase transition type guest/host liquid crystal enables the procurement of a high contrast with no use of a polarizing plate, when driving it the application of a high voltage was needed for releasing the helicoid.

Accordingly, because of its large power consumption, the phase transition type guest/host liquid crystal had the problem that when it was applied to portable electronic devices, the time period in which a battery was used therein was short.

Also, in the pixel electrode of the phase transition type guest/host liquid crystal, time and labour were needed to perform the treatment for producing the light reflecting film whose concavities and convexities causing uniform scatter of light have been formed by etching.

Also, in the fabrication of the light reflecting film having concavities and convexities by etching, there was a limitation with respect to enlarging the depth of the concavities and convexities and so the scattering of light was not sufficient, the resulting structure therefore having a problem with the brightness demanded of the liquid crystal display panel.

Further, while electronic devices are for the most part arranged to reflect light, which is incident thereupon from a direction inclined by an angle of 30° with respect to the direction orthogonal thereto, in this direction orthogonal thereto, there are also electronic devices such as televisions which are wanted to be viewed by a plurality of persons or electronic devices such as wrist watches in which it is better to reflect the incident light from the orthogonal direction in this orthogonal direction. With regard to the light reflecting film of the liquid crystal display panel used in the electronic devices, it was difficult to control the configuration of the concavities and convexities so as to enable the uniform reflection of light whose incident angle was different.

SUMMARY OF THE INVENTION

The present invention has been made in order to solve the above-described problems and an object of the present invention is to provide a liquid crystal display panel whose image plane is high in luminance, by making up the light reflecting film into a porous layer and thereby making the light to be scattered large in amount.

Another object of the present invention is to provide a method for manufacturing the light reflecting film of the liquid crystal display panel, which enables the simple control of the configuration of the porous layer by subjecting the light reflecting film to anodic oxidation.

To attain the above objects, according to a first aspect of the present invention, the liquid crystal display panel according thereto uses a phase transition type guest/host liquid crystal shown in FIG. 1. It comprises pixel electrodes 15 disposed on an active matrix substrate 11 in the form of a matrix with an interlayer insulating film 14 therebetween and respectively connected to thin film transistors 13 and light reflecting films 16 formed in an upper surface of the pixel electrodes, the light reflecting films consisting of a porous layer.

According to a second aspect of the present invention, the light reflecting film of the liquid crystal display panel of the present invention is arranged such that the porous layer of the same configuration is multilayered.

According to a third aspect of the present invention, the light reflecting film of the liquid crystal display panel of the present invention is arranged such that the porous layer of a different configuration is multilayered.

According to a fourth aspect of the present invention, the liquid crystal display panel of the present invention is composed of switching thin film transistors 13 respectively connected to the pixel electrodes disposed in the form of a matrix and driving thin film transistors disposed around a display portion.

According to a fifth aspect of the present invention, each of the pixel electrodes and the light reflecting films of the present invention is made of material having at least aluminum as its main component.

According to a sixth aspect of the present invention, each of the pixel electrodes and the light reflecting films of the present invention is made of material containing scandium, having at least aluminum as its main component.

According to a seventh aspect of the present invention, the light reflecting film of the liquid crystal display panel of the present invention consists of an anodic oxide film.

According to an eighth aspect of the present invention, a method for manufacturing the light reflecting film of the liquid crystal display panel of the present invention comprises the step of forming by anodic oxidation the light reflecting film consisting of a porous layer with respect to an upper surface of the pixel electrode made of material having at least aluminum as its main component.

According to a ninth aspect of the present invention, a method for manufacturing a light reflecting film of the liquid crystal display panel of the present invention controls the configuration of the porous layer by changing at least one of the concentration of aqueous solution of oxalic acid, the voltage value, the current value, the time duration in which the voltage is applied, and the time duration in which the current is applied.

DETAILED DESCRIPTION OF THE PREFERRED EMBODIMENTS

First Invention

Figure 1:
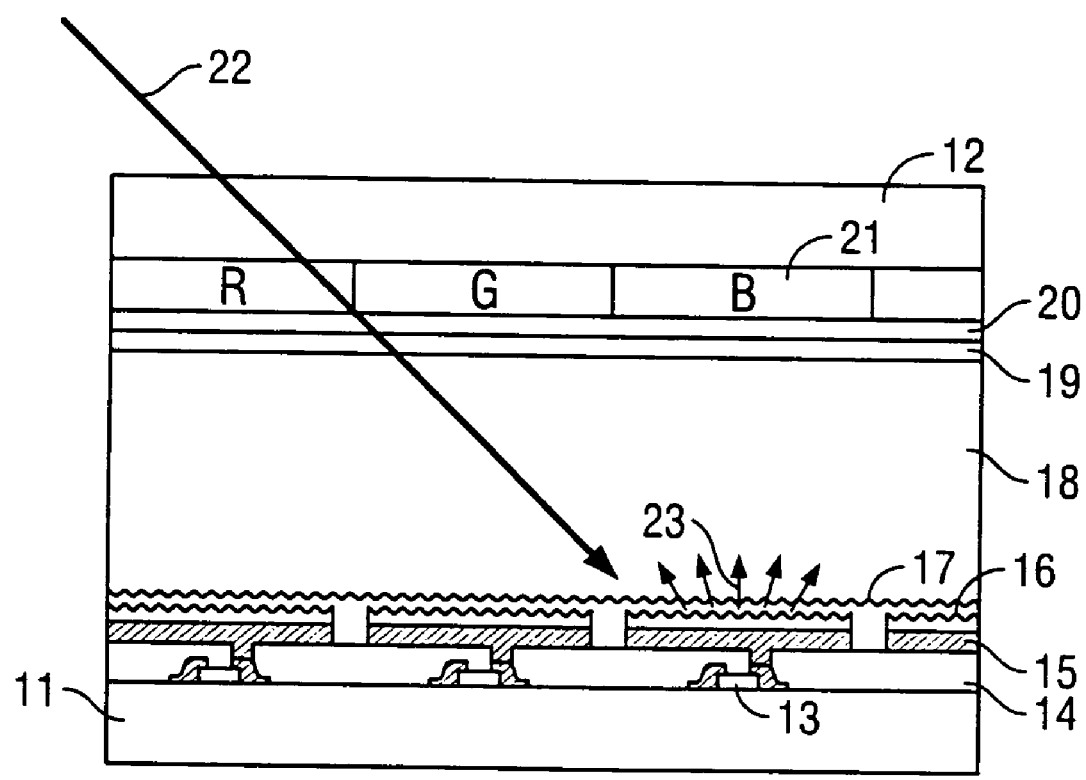
FIG. 1 is a typical view of an embodiment of the present invention, illustrating the section of one pixel of a liquid crystal display panel using a phase transition type guest/host liquid crystal.

A liquid crystal display panel of the present invention is arranged such that between an active matrix substrate and an opposing substrate there are formed sequentially on an upper surface of the active matrix substrate thin film transistors, interlayer insulating film, pixel electrodes, light reflecting films, orientation film, phase transition type guest/host liquid crystal, orientation film, opposing electrode and color filter in this order. The pixel electrodes are disposed on the active matrix substrate in the form of a matrix with the interlayer insulating film therebetween and are respectively connected to the thin film transistors.

Also, the light reflecting film having a porous layer is formed on the upper surface of the pixel electrode.

In the present invention, by changing the diameter and depth of the pores of the porous layer formed as the light reflecting film, the scattering of light can be made large in amount and the incident light can be reflected in a desired direction. Therefore, the present invention can be applied as a liquid crystal display panel for use in a wide range of electronic devices.

Regarding the light reflecting film of the present invention, since the light reflecting film having a low resistance is formed on part of the pixel electrode, the voltage for driving the liquid crystal display panel can be made low in level.

Second Invention

The light reflecting film of the liquid crystal display panel of the present invention is arranged such that the porous layer of the same configuration is multilayered. When making the porous layer of the same configuration multilayer, the surface area of the light reflecting film becomes large, with the result that the light can be scattered uniformly and in large amount.

Third Invention

The light reflecting film of the liquid crystal display panel of the present invention is arranged such that the porous layer of a different configuration is multilayered. When making the porous layer of a different configuration multilayer, the angle at which light is scattered uniformly can be changed.

That is, the liquid crystal display panel of the present invention can be applied to wrist watches or other new use purposes as well as to the electronic devices such as televisions, word processors, etc.

Fourth Invention

The liquid crystal display panel of the present invention is provided on a glass substrate with switching thin film transistors respectively connected to the pixel electrodes disposed in the form of a matrix and controlling thin film transistors disposed at peripheral region of a display portion.

In the present invention, since the switching thin film transistors and the controlling thin film transistors can be simultaneously fabricated on single glass substrate, it is possible to obtain an electronic device which is inexpensive and high in performance.

Fifth to Eighth Inventions

Each of the pixel electrodes and light reflecting films of the present invention is made of material having at least aluminum as its main component. And, the light reflecting film located on the pixel electrode is subjected to anodic oxidation and an anodic oxide film having a porous layer is thereby formed.

In the light reflecting film made of material having at least aluminum as its main component, fine projections are generated on the surface thereof by the heat generated when anodic oxidation is performed. These fine projections are removed by using a material wherein a small amount of scandium is added to the material having at least aluminum as its main component.

The anodic oxide film produced on the surface of the material having at least aluminum as its main component is a porous layer and also is opalescent. Therefore, the scattering of light can be effected in larger amount and the resulting liquid crystal display panel becomes one which is high in luminance.

Ninth Invention

A method for manufacturing the light reflecting film of the liquid crystal display panel of the present invention controls the configuration of the porous layer by changing at least one of the concentration of aqueous solution of oxalic acid, the voltage value, the current value, the time duration in which the voltage is applied, and the time duration in which the current is applied. For example, by changing the parameters, it is possible to change the size, depth, configuration, etc. of the pores of the porous layer in the light reflecting film. And, the porous layer of the light reflecting film makes it possible to easily change the reflection direction of light, or to easily scatter light in large amount and uniformly.

Embodiments

FIG. 1 is a typical view of an embodiment of the present invention, illustrating the section of one pixel of a liquid crystal display panel using a phase transition type guest/host liquid crystal.

In FIG. 1, between an active matrix substrate 11 and an opposing substrate 12, there are formed sequentially from an upper surface of the active matrix substrate 11 thin film transistors 13, interlayer insulating film 14, pixel electrodes 15, light reflecting films 16 formed on the surface of the pixel electrodes, orientation film 17, phase transition type guest/host liquid crystal 18, orientation film 19, opposing electrode 20, and color filter 21 in this order.

On the upper surface of the active matrix substrate 11 made of glass or quartz, the thin film transistors 13 corresponding to a numeric value three times (red, green and blue) as large as the number of the pixels are formed in the form of a matrix.

In a case where the active matrix substrate 11 is made of quartz, it is preferable that the thin film transistor 13 be formed using high-temperature polysilicon or intermediate-temperature polysilicon. In a case where the active matrix substrate 11 is made of glass, it is preferable that the thin film transistor 13 be formed using a low-temperature polysilicon.

The interlayer insulating film 14 is intended to insulate the thin film transistor 13, the pixel electrode 15 and electrodes, signal lines, etc. not illustrated and can be produced using silicon oxide, silicon nitride or organic resin. On the upper surface of the active matrix substrate 11 the thin film transistors 13 and pixel electrodes 15 corresponding to a numeric value three times as large as the number of the pixels are formed in the form of a matrix by being insulated by the interlayer insulating film 14.

The pixel electrode 15 is formed on the interlayer insulating film 14 by, for example, sputtering. The pixel electrode 15 is made of a low-resistance material such as material having at least aluminum as its main component (this material will hereinafter be referred to simply as "aluminum") and, on the surface thereof, there is formed an anodic oxide film by anodic oxidation performed with respect thereto.

Regarding the anodic oxidation, when electrolysis is made in a solution, on the anode side electrons move from the solution side to within the electrode and so oxidizable material in the solution is oxidized. For example, electrolysis is made with an aluminum electrode being placed in a 3% aqueous solution of oxalic acid. An anodic oxide film, light reflecting film 16, consisting of a porous layer is formed on the surface of the aluminum electrode.

When expressed in the form of a typical view, the porous layer produced on the surface of the aluminum electrode, light reflecting film 16, is arranged such that fine holes, oxide cells each surrounding this fine hole and barrier layers each constituting the bottom portion of the fine hole are successively formed in large number. Accordingly, the configuration of the porous layer can be changed by varying the conditions of the anodization treatment.

Light is repeatedly reflected in the pore of the porous layer and part thereof passes through the barrier layer.

Regarding the light reflecting film consisting of the porous layer, compared to that whose concavities and convexities are formed by a chemical etching technique using acid such as hydrofluoric acid treatment, the depth of the pores is large and the surface area where light is reflected is large. Therefore, the scattering of light is large in amount and light is uniformly reflected. That is, in the light reflecting film consisting of the porous layer, the dependency of the reflected light upon the incident angle becomes small as in the case of a mirror reflection and therefore an image plane easy to view and high in luminance can be obtained.

The phase transition type guest/host liquid crystal 18 is sealed between the pixel electrode 15 and the opposing electrode 20. And, in its natural state, the phase transition type guest/host liquid crystal 18 is such that the host liquid crystal molecules are helically arranged. In a state where a voltage is applied thereto, the helicoid is released with the result that the molecules are arranged vertically with respect to the opposing substrate 12. For this reason, the phase transition type guest/host liquid crystal 18 makes it possible to obtain a high contrast without using a polarizing plate.

In the above-mentioned liquid crystal display panel, incident light 22 having entered from the outside transmits through the opposing substrate 12, color filter 21, opposing electrode 20, orientation film 19, phase transition type guest/host liquid crystal 18 and orientation film 17 and then is reflected by the light reflecting film 16 consisting of an anodic oxide and the pixel electrode 15, whereupon the resulting light advances through a path reverse to that through which the incident light entered and goes outside, thus becoming a reflected light 23.

And, the concavities and convexities in the surface of the light reflecting film 16 are so designed that, for example, the light having entered from a direction inclined by an angle of 30° with respect to the direction orthogonal to the light reflecting film 16 may be strongly reflected in this direction orthogonal thereto.

Figure 2:
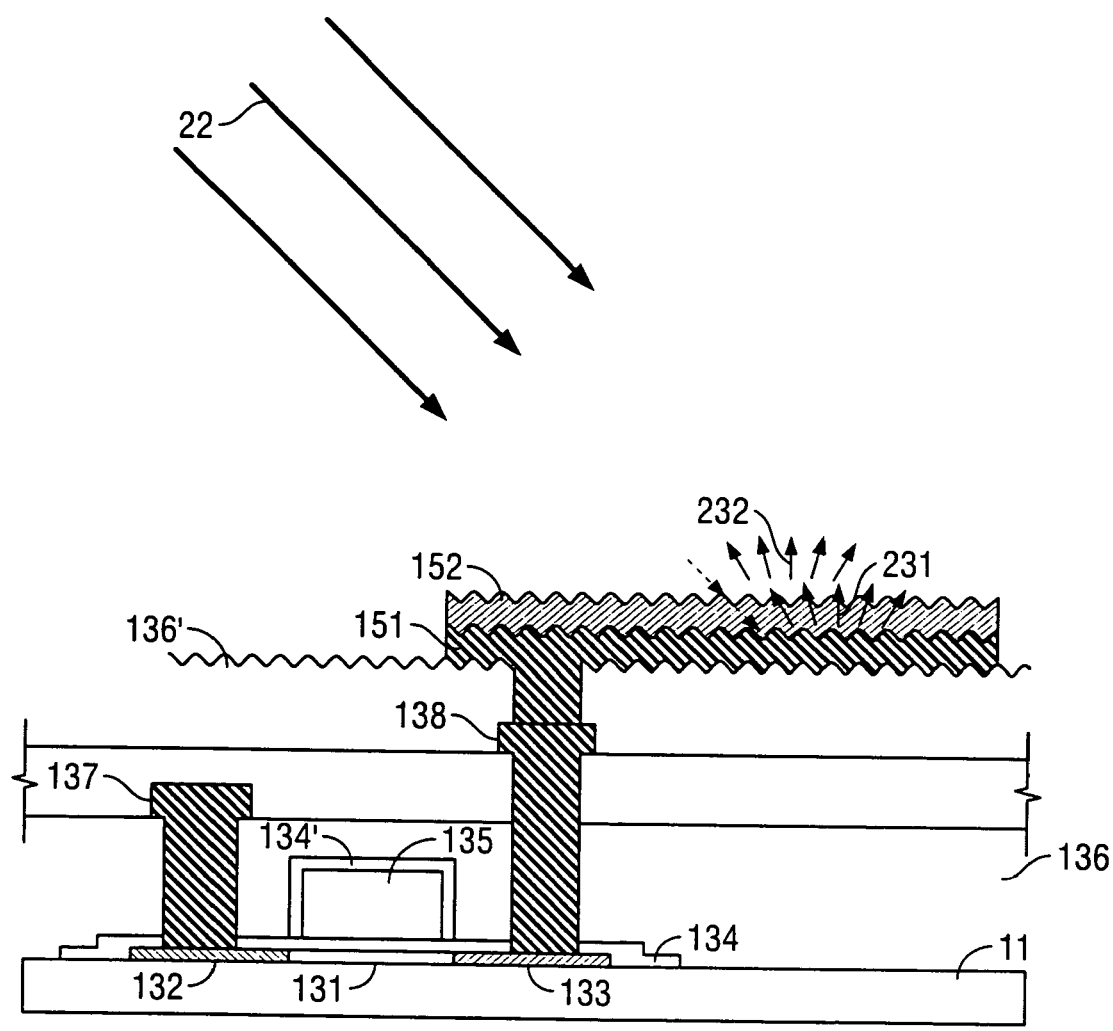
FIG. 2 is a typical view of the embodiment of the present invention, illustrating on an enlarged scale part of the liquid crystal display panel in FIG. 1.

FIG. 2 is the embodiment of the present invention and is a typical view illustrating on an enlarged scale part of the liquid crystal display panel in FIG. 1.

In FIG. 2, the active matrix substrate 11 is made using #173 glass manufactured by CORNING Limited and its size is set to be 127 mm×127 mm. And, the thin film transistor 13 formed on the active matrix substrate 11 is fabricated as follows.

On the glass substrate, amorphous silicon or polycrystalline silicon 131 is formed as matrix-like islands by photolithography.

An impurity is added to the polycrystalline silicon 131 and undergoes the promotion of the crystallization in order to form a source region 132 and a drain region 133 at prescribed positions. Thereafter, a gate insulating film 134 is formed on these regions. Also, a gate electrode 135 is formed on a channel formation region of the polycrystalline silicon 131 by a known method. Next, a gate insulating film 134' is formed on the gate electrode 135 and interlayer insulating films 136 and 136' are formed in the respective thin film transistors 13. Further, contact holes are formed in the gate insulating film 134 and interlayer insulating film 136, whereby a gate electrode 137 and a drain electrode 138 are formed therein. It is to be noted that the thin film transistor 13 can be fabricated by known means other than in accordance with the above described procedure, such as "through doping" wherein an impurity is added through the gate insulating film 134.

On the interlayer insulating film 136' of the thin film transistor 13 there is formed to a thickness of 4000 Å an aluminum film 151 containing 0.2 wt % of scandium.

This scandium serves to suppress the production of fine projections which is made on the surface of the aluminum film 151 at the time of heat treatment. Thereafter, anodic oxidation is performed of the aluminum film 151 in order to obtain a porous layer on the surface thereof.

The anodic oxidation of the aluminum film 151 is performed, for example, in an electrolyte filled in a quartz tub (not illustrated), with the aluminum film 151 being set to be the anode while, on the other hand, platinum (not illustrated) is set to be the cathode. The aluminum film 151 and the platinum electrode are disposed in such a way as to oppose each other, respectively, on both sides of the quartz tub.

As the electrolyte there is used, for example, one prepared by adjusting a 3% aqueous solution of oxalic acid to pH=1.9. During the anodic oxidation of the aluminum film 151, the electrolyte is stirred in order not to disturb the liquid surface of the quartz tub. When stirring the electrolyte, the temperature distribution thereof becomes fixed, whereby the thickness of the anodic oxide film can be made fixed.

In this embodiment, the anodic oxidation was performed using a stirrer with the rotations number thereof being set to be 200 rpm and the electrolyte temperature at that time being maintained to be 30° C. And, a direct current power source is connected to the anode electrode and cathode electrode. Also, the direct current power source is arranged so that changeover can be made between the ending of the constant current and the outputting of the constant voltage.

When an electric field is applied from the direct current power source to the anode electrode and cathode electrode, an anodic oxidation reaction occurs with the result that an oxide film in the form of a porous layer starts to grow on the surface of the anode (aluminum) electrode. In this embodiment, the amount of current between the both electrodes at this time is maintained to be fixed (the constant current mode) and the oxide film is thereby kept growing, the current at this time being set to be 0.5 mA.

In this embodiment, when a voltage of 1.5 V has been applied for 20 seconds, the anodization treatment was completed. The thickness of the anodic oxide film 152 at this time was 1500 Å.

After the anodic oxide film has been formed on the aluminum electrode, the anodic oxide film and aluminum electrode have been patterned into a desired configuration by a known method, with the result that the pixel electrodes in the form of a matrix have been formed.

Also, as illustrated in FIG. 2, when having entered into the liquid crystal display panel, the incident light 22 partly transmits through the anodic oxide film 152 which is semi-transparent to become a reflected light 231 and is for the most part scattered by the anodic oxide film 152 consisting of a porous layer to become a reflected light 232. The reflection can be further improved by making the upper surface of the layer 136' irregular using a known technique.

Figure 3:
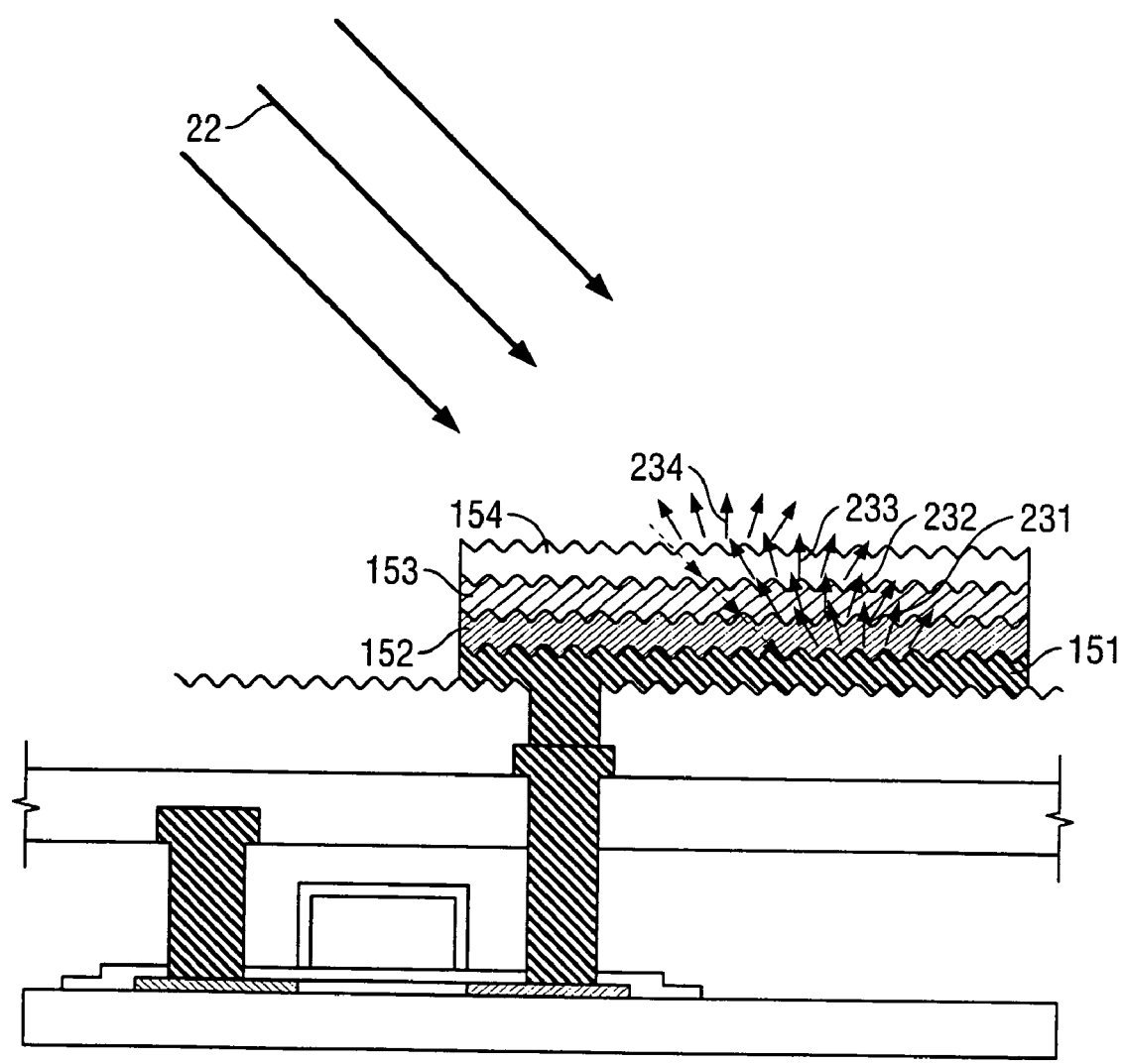
FIG. 3 is a typical view of another embodiment of the present invention, illustrating a case where a light reflecting film has been made up into a multi-layer film structure.

FIG. 3 illustrates another embodiment of the present invention and is a typical view illustrating a case where the light reflecting film has been made multilayered. It is to be noted that while since FIGS. 1 to 3 are typical views the porous layer of the present invention is simply depicted with the configuration thereof being in the form of concavities and convexities, the depth thereof is larger another embodiment the anodic oxide films having different reflection surfaces can be made multilayered.

In accordance with this embodiment of the present invention, the first anodic oxide film 152 close to the aluminum film 151 is relatively dense as compared with the outer anodic oxide film 154. The anodic oxide film 153 between the films 152 and 154 has an intermediate density. In other words, the laminate anodic oxide layers should be made more porous at a portion distant from the aluminum film 151. This may be made in a continuous manner or in a stepwise manner.

For example, when an aqueous solution of oxalic acid (pH≅2) is used as an anodic electrolyte for forming the second anodic oxide film 153, an aqueous solution of citric acid or tartaric acid (pH≅2 to 3), and an aqueous solution of phosphoric acid (pH≅1 to 2) may be used for forming the inner film 152 and the outer film 154, respectively.

Regarding the anodic oxide film, it is also possible to form the anodic oxide films whose porous layers have their pores different in configuration by changing the magnitude of the current. For example, when causing a gradual increase in the amount of current during the anodic oxidation, the surface of the anodic oxide film has the tendency that the depth and diameter of the pores in the porous layer thereof come to vary. Also, the final configuration of the anodic oxide film is influenced by the surface roughness of the underlying layer. Accordingly, making the anodic oxide film multilayered enables free control of the angle at which, and the amount in which, the light is scattered, by combining the anodic oxide films whose porous layers are different in configuration.

For example, in order to make the anodic oxide film multilayered as described above, first, the current value is set to be large to thereby form an oxide film whose reflection angle is large and the reflection surface is thereby schematically formed beforehand. Next, in order to obtain a reflection characteristic corresponding to the design, the current value is made small to thereby form an anodic oxide film whose porous layer has its pores small in depth and large in diameter. By doing so, the anodic oxide film which was initially formed can be further modified and can have its reflection characteristic approached to a desired one.

The surface of the anodic oxide film fabricated in the above-described embodiment was such that the porous layer thereof had a composite configuration of fine pores having a depth of 500 Å and a pitch of 1 μm or less and somewhat large pores having the same depth and a pitch of approximately 1 μm to 5 μm. Also, when having viewed the surface of the anodic oxide film under the white light, this surface was opalescent.

Further, the withstand voltage of the anodic oxide film was 0 V because of the resistance thereof was appreciably low.

In the anodic oxide films whose porous layers are each different in configuration from each other, the reflection with respect to the incident light more or less differs according to the layer and therefore scattering of light occurs over a wide range. That is, the liquid crystal display panel having such anodic oxide films can be designed for use in a television fine to view from any direction. In contrast to this, in the case of the anodic oxide film consisting of one layer such as that illustrated in FIG. 1, it is also possible to reflect the light incident from the orthogonal direction to the liquid crystal display panel in this orthogonal direction. Therefore, the liquid crystal display panel having such anodic oxide film can be designed so as to conform to an electronic device such as a wrist watch.

The anodic oxide film makes it possible to fabricate the liquid crystal display panel conforming to the use purpose specific for an electronic device by varying the configuration of its porous layer, the configuration of the pores thereof, the depth of the pores thereof, etc.

Also, in the light reflecting film consisting of the above-described anodic oxide film, it is possible to vary the diameter, depth or configuration of the pores of the porous layer by controlling in the electrolysis the voltage value, current value, concentration of the aqueous solution, time duration, etc.

Next, the specification of the liquid crystal display panel trial manufactured in accordance with the embodiment illustrated in FIG. 1 is shown below.

| Item | Performance |
| --- | --- |
| Display Size | Diagonal 5 inches |
| Pixels Number | 920,000 pixels (640 × 480 × 3) |
| Aperture Ratio | 70% |
| Display Mode | TFT driven guest/host type |
| Displayed Colors Number | 8 colors |
| Contrast Ratio | 5 |
| Drive Voltage ($V_{0-P}$) | 6 V |
| Response Speed($T_{ON} + T_{OFF}$) | 100 ms or less |
| Power Consumption | 10 mW |

Figure 4:
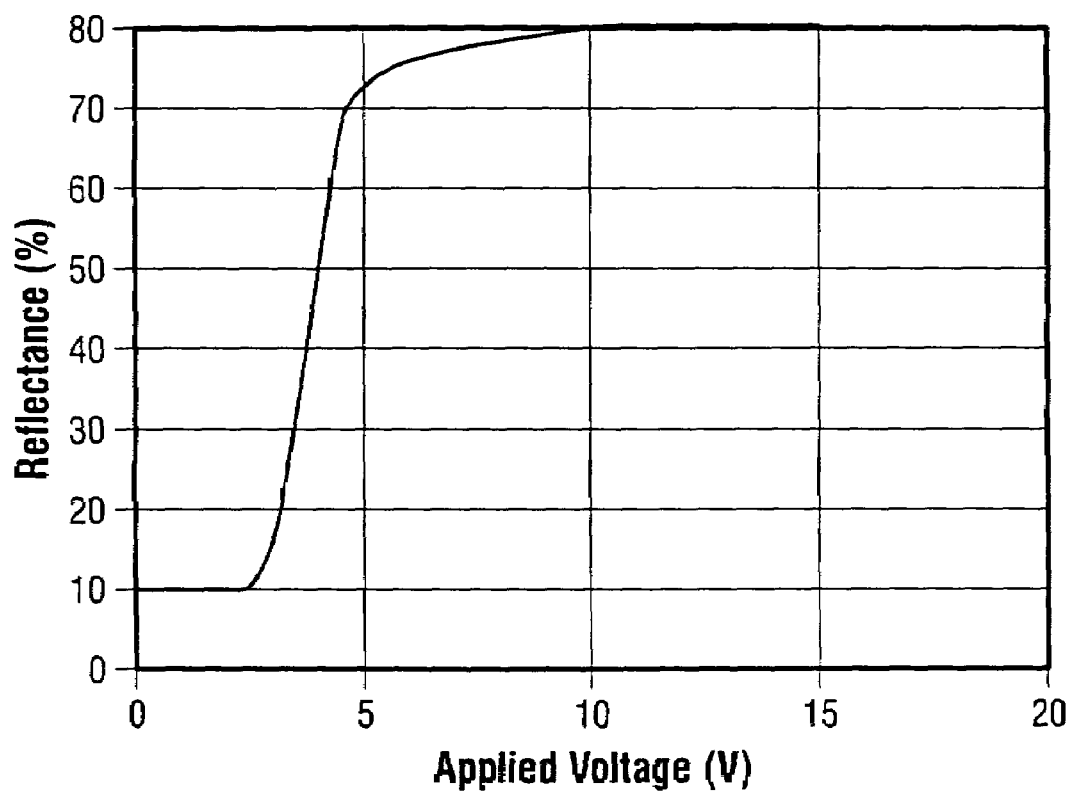
FIG. 4 is a graph illustrating the reflectance/voltage characteristic of a prototype liquid crystal display panel trial manufactured in accordance with the embodiment.
Figure 5:
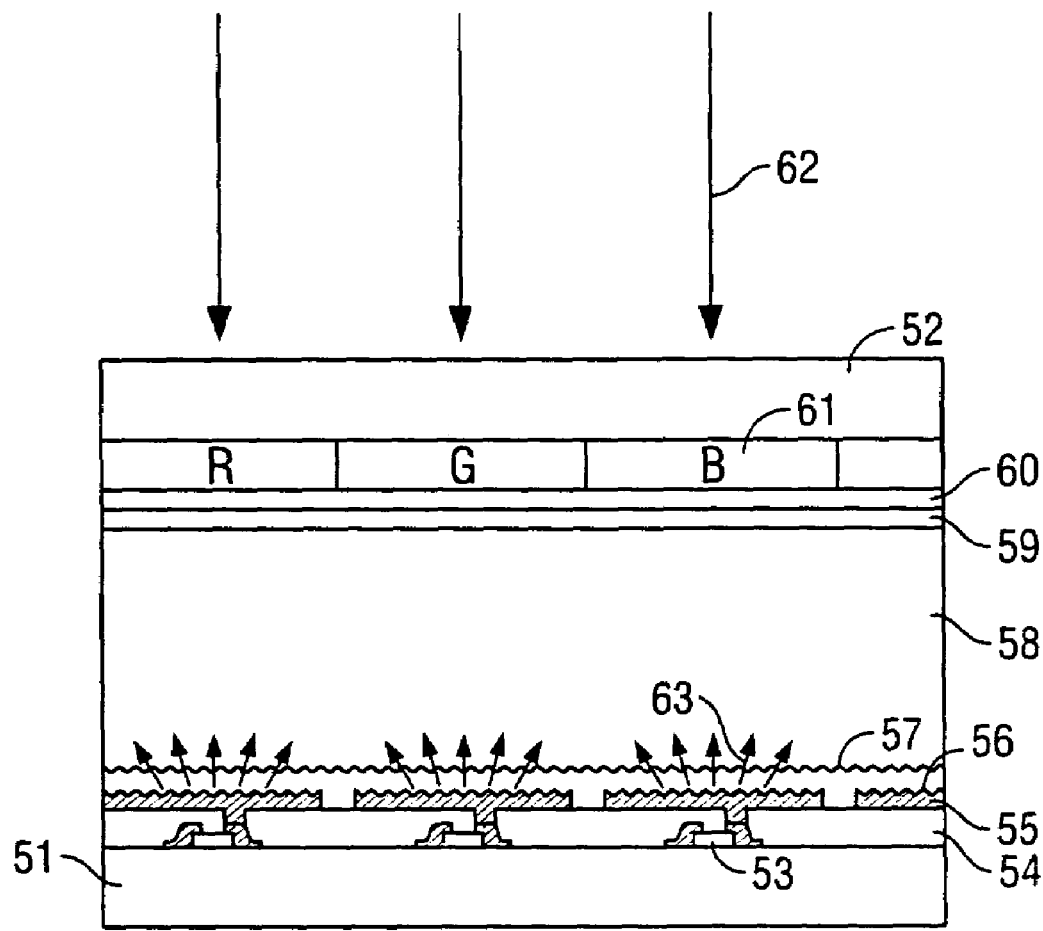
FIG. 5 is a typical view of a conventional example, illustrating the section of one pixel of a liquid crystal display panel using a phase transition type guest/host liquid crystal.

FIG. 4 is a graph illustrating the reflectance/voltage characteristic of the prototype liquid crystal display panel trial manufactured in accordance with this embodiment.

The reflectance (%) of the prototype liquid crystal display panel trial manufactured with respect to the applied voltage indicates that high reflectance is obtained in a range wherein the applied voltage is low as illustrated in FIG. 4.

Although the present embodiments have been described above in detail, the present invention is not limited to the above-described embodiments. The present invention enables various designs and modifications to be made without departing from the spirit and claimed scope of the invention.

For example, the pixel electrode and light reflecting film are not limited to those referred to in the above-described embodiments if they are made of an aluminum alloy or material high in optical reflection coefficient as well as aluminum. Fabrication of the light reflecting film is not limited to that made by anodic oxidation if a porous layer is formed as this film. The liquid crystal display panel can be applied as a display device to any use purpose that includes electronic devices.

According to the present invention, the light reflecting film does not have a smooth surface but, since it consists of a porous layer, has an appropriate surface roughness. Therefore, the reflected light is less dependent upon the incident angle and so the entire liquid crystal display panel can be made to have an appropriate degree of brightness.

According to the present invention, since the light reflecting film is made porous into a porous layer by anodic oxidation, the configuration, diameter, depth, etc. of the pores thereof can be easily controlled.

According to the present invention, since the diameter, depth, etc. of the pores of the light reflecting film can be freely varied, the resulting liquid crystal display panel can be applied to many use purposes.

According to the present invention, when forming an anodic oxide film consisting of a porous layer as the light reflecting film, the resistance of the oxide film can be decreased. Therefore, it does not happen that the drive voltage is partially applied to the anodic oxide film, and so it is possible to effectively apply a voltage to liquid crystal material.

What is claimed is:

1. A method for manufacturing a display device comprising:
    forming a thin film transistor over a substrate, the thin film transistor comprising a semiconductor film and a gate electrode with a gate insulating film interposed therebetween;
    forming an insulating film over the thin film transistor;
    forming a pixel electrode over the insulating film; and
    forming a porous layer on a surface of the pixel electrode while controlling a configuration of the porous layer by changing a current value.

2. A method for manufacturing a display device according to claim 1, wherein the pixel electrode comprises aluminum.

3. A method for manufacturing a display device according to claim 1, wherein the insulating film comprises at least one selected from the group consisting of silicon oxide, silicon nitride, and a resin.

4. A method for manufacturing a display device according to claim 1, wherein the porous layer comprises an anodic oxide film.

5. A method for manufacturing a display device according to claim 1, wherein the porous layer is a lamination layer.

6. A method for manufacturing a display device comprising:
- forming a thin film transistor over a substrate, the thin film transistor comprising a semiconductor film and a gate electrode with a gate insulating film interposed therebetween;
- forming an insulating film over the thin film transistor;
- forming a pixel electrode over the insulating film; and
- forming a porous layer on a surface of the pixel electrode while controlling a configuration of the porous layer by changing a duration time in which a current is applied.

7. A method for manufacturing a display device according to claim 6, wherein the pixel electrode comprises aluminum.

8. A method for manufacturing a display device according to claim 6, wherein the insulating film comprises at least one selected from the group consisting of silicon oxide, silicon nitride, and a resin.

9. A method for manufacturing a display device according to claim 6, wherein the porous layer comprises an anodic oxide film.

10. A method for manufacturing a display device according to claim 6, wherein the porous layer is a lamination layer.

11. A method for manufacturing a display device comprising:
- forming a thin film transistor over a substrate, the thin film transistor comprising a semiconductor film and a gate electrode with a gate insulating film interposed therebetween;
- forming an insulating film over the thin film transistor;
- forming a pixel electrode over the insulating film; and
- forming a porous layer on a surface of the pixel electrode while controlling a configuration of the porous layer by changing a concentration of an oxalic acid.

12. A method for manufacturing a display device according to claim 11, wherein the pixel electrode comprises aluminum.

13. A method for manufacturing a display device according to claim 11, wherein the insulating film comprises at least one selected from the group consisting of silicon oxide, silicon nitride, and a resin.

14. A method for manufacturing a display device according to claim 11, wherein the porous layer comprises an anodic oxide film.

15. A method for manufacturing a display device according to claim 11, wherein the porous layer is a lamination layer.

16. A method for manufacturing a display device comprising:
- forming a thin film transistor over a substrate, the thin film transistor comprising a semiconductor film and a gate electrode with a gate insulating film interposed therebetween;
- forming an insulating film over the thin film transistor;
- forming a pixel electrode over the insulating film; and
- forming a porous layer on a surface of the pixel electrode while controlling a configuration of the porous layer by changing a voltage value.

17. A method for manufacturing a display device according to claim 16, wherein the pixel electrode comprises aluminum.

18. A method for manufacturing a display device according to claim 16, wherein the insulating film comprises at least one selected from the group consisting of silicon oxide, silicon nitride, and a resin.

19. A method for manufacturing a display device according to claim 16, wherein the porous layer comprises an anodic oxide film.

20. A method for manufacturing a display device according to claim 16, wherein the porous layer is a lamination layer.

21. A method for manufacturing a display device comprising:
- forming a thin film transistor over a substrate, the thin film transistor comprising a semiconductor film and a gate electrode with a gate insulating film interposed therebetween;
- forming an insulating film over the thin film transistor;
- forming a pixel electrode over the insulating film; and
- forming a porous layer on a surface of the pixel electrode while controlling a configuration of the porous layer by changing a time duration in which a voltage is applied.

22. A method for manufacturing a display device according to claim 21, wherein the pixel electrode comprises aluminum.

23. A method for manufacturing a display device according to claim 21, wherein the insulating film comprises at least one selected from the group consisting of silicon oxide, silicon nitride, and a resin.

24. A method for manufacturing a display device according to claim 21, wherein the porous layer comprises an anodic oxide film.

25. A method for manufacturing a display device according to claim 21, wherein the porous layer is a lamination layer.

* * * * *